(12) United States Patent
Jankowski et al.

(10) Patent No.: US 8,782,750 B2
(45) Date of Patent: Jul. 15, 2014

(54) COLLABORATIVE GATEWAY

(75) Inventors: Peter A. Jankowski, Rancho Santa Fe, CA (US); Daniel T. Petkevich, Solana Beach, CA (US); Raffy Kaloustian, El Cajon, CA (US); Brian E. Dean, Matthews, NC (US); Xihong Zhuang, San Marcos, CA (US); Rand D. Anderson, Cardiff, CA (US)

(73) Assignee: Next Level Security Systems, Inc., Carlsbad, CA (US)

( * ) Notice: Subject to any disclaimer, the term of this patent is extended or adjusted under 35 U.S.C. 154(b) by 470 days.

(21) Appl. No.: 13/093,697

(22) Filed: Apr. 25, 2011

(65) Prior Publication Data

US 2012/0272293 A1  Oct. 25, 2012

(51) Int. Cl.
G06F 7/04 (2006.01)
H04L 29/06 (2006.01)
G06F 21/62 (2013.01)

(52) U.S. Cl.
CPC .............. H04L 63/14 (2013.01); G06F 21/62 (2013.01)
USPC .................... 726/4; 726/5; 709/224; 370/229; 370/353; 370/354; 370/355; 370/409; 382/116

(58) Field of Classification Search
CPC .......... H04L 63/14; G06F 21/60; G06F 21/62
USPC .......... 726/4–5; 709/224; 370/229, 351–356, 370/401–409; 382/115–116; 700/17, 19
See application file for complete search history.

(56) References Cited

U.S. PATENT DOCUMENTS

| 5,991,429 | A | 11/1999 | Coffin et al. |
| 6,064,653 | A | 5/2000 | Farris |
| 7,123,142 | B2 | 10/2006 | Bonbot et al. |
| 7,586,899 | B1 | 9/2009 | Mohaban et al. |

(Continued)

FOREIGN PATENT DOCUMENTS

WO  WO-2009155574  12/2009

OTHER PUBLICATIONS

Manner, J.;et al.;"An Internet SIP Gateway for Ad-hoc Networks"; Sensor and Ad Hoc Communications and Networks, 2006. SECON '06. 2006 3rd Annual IEEE Communications Society on vol. 3; Digital Object Identifier: 10.1109/SAHCN.2006.288554 Publication Year: 2006 , pp. 740-745.*

(Continued)

*Primary Examiner* — Hadi Armouche
*Assistant Examiner* — Angela Holmes
(74) *Attorney, Agent, or Firm* — Schwegman Lundberg & Woessner, P.A.

(57) ABSTRACT

A method and a system for monitoring and controlling remote devices are described. The system has a gateway, a web server, and a client device. The gateway is coupled to a security device. The web server has a management application configured to communicate with the gateway. The management application has a service manager module to enable additional services from the gateway and the security device. The client device communicates with the gateway identified by the web server. The gateway aggregates monitoring data from the security device and from other security devices respectively coupled to other gateways correlated with the gateway. The client device receives the aggregated monitoring data, controls the security device coupled to the respective gateway from a web-based user interface at the client device.

14 Claims, 12 Drawing Sheets

(56) References Cited

U.S. PATENT DOCUMENTS

| | | | |
|---|---|---|---|
| 2001/0034754 A1* | 10/2001 | Elwahab et al. | 709/201 |
| 2002/0013679 A1 | 1/2002 | Petite | |
| 2002/0111698 A1* | 8/2002 | Graziano et al. | 700/17 |
| 2003/0126465 A1 | 7/2003 | Tassone et al. | |
| 2005/0270151 A1 | 12/2005 | Winick | |
| 2009/0315972 A1* | 12/2009 | Rensin et al. | 348/14.02 |
| 2010/0011432 A1* | 1/2010 | Edery et al. | 726/11 |
| 2011/0256846 A1* | 10/2011 | Sadana et al. | 455/411 |

OTHER PUBLICATIONS

Assaf, N.; et al.;"Interworking between IP security and performance enhancing proxies for mobile networks";Communications Magazine, IEEE vol. 40 , Issue: 5 ;Digital Object Identifier: 10.1109/35.1000225; Publication Year: 2002 , pp. 138-144.*

"Gateway Load Balancing Protocol", http://www.cisco.com/en/US/docs/ios/12_2t/12_2t15/feature/guide/ft_glbp.html#wp1027177, (Observed on Jul. 27, 2011), 42 pages.

"Video Surveillance", http://www.adt.com/home-security/solutions/video-surveillance, (observed on Jul. 27, 2011), 3 pages.

* cited by examiner

|  | GATEWAY 200 | | |
|---|---|---|---|
| API | CAMERA API 212 | ACCESS CONTROL API 216 | OTHER API 222 | . . . . .
| MODULES | CAMERA MODULE 214 | ACCESS CONTROL MODULE 218 | OTHER MODULE 224 | . . . . .
| DRIVERS | CAMERA DRIVERS 218 | ACCESS CONTROL DRIVERS 220 | OTHER DRIVERS 226 | . . . . .

FIG. 2B

COLLABORATIVE GATEWAY

TECHNICAL FIELD

This application relates generally to the field of computer technology, and in a specific example embodiment, a web-based collaborative gateway.

BACKGROUND

Systems for monitoring and/or controlling security devices have become increasingly popular in recent years. Such systems are used to communicate with security devices such as lights, thermostats, or security systems.

Some conventional systems for controlling and monitoring security devices allow a user to access a server from a remote location using a device such as a desktop computer. For example, a user can use a desktop computer located in a remote location to connect with the server. The user can then send commands to the server to control various security devices. For example, the user can turn lights on or off. In another example, the user accesses a video feed stored at the server that receives a video stream from a camera at a monitored location.

Such conventional systems for controlling and/or monitoring security devices have at least the following disadvantages and limitations. The connection between the user's remote computer and the server may not be secured. A user could establish a secure connection, but the cost and complexity involved in establishing such a connection are high. Such systems are also complex for users to implement and maintain. For example, the server may be difficult to install and configure. Programming such systems can also be cumbersome and require custom configurations when adding supplemental security devices or services. Last, it is difficult for the user to access the server using different types of remote devices. For instance, conventional systems only allow a user to access the offsite server using, for example, a secured desktop computer located in the user's workplace.

BRIEF DESCRIPTION OF THE DRAWINGS

The present invention is illustrated by way of example, and not by way of limitation, in the figures of the accompanying drawings in which:

FIG. 2B is a block diagram illustrating another example embodiment of a gateway;

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a method and a system for monitoring and controlling devices connected to gateways are described. In an example embodiment, the system has a gateway, a web server, and a client device. The gateway is coupled to a security device. The web server has a management application configured to communicate with the gateway. The management application has a service manager module to enable additional services from the gateway and the security device. The client device communicates with the gateway identified by the web server. The gateway aggregates monitoring data from the security device and from other security devices respectively coupled to other gateways correlated with the gateway. The client device receives the aggregated monitoring data, controls the security device coupled to the respective gateway from a web-based user interface at the client device.

Figure 1:
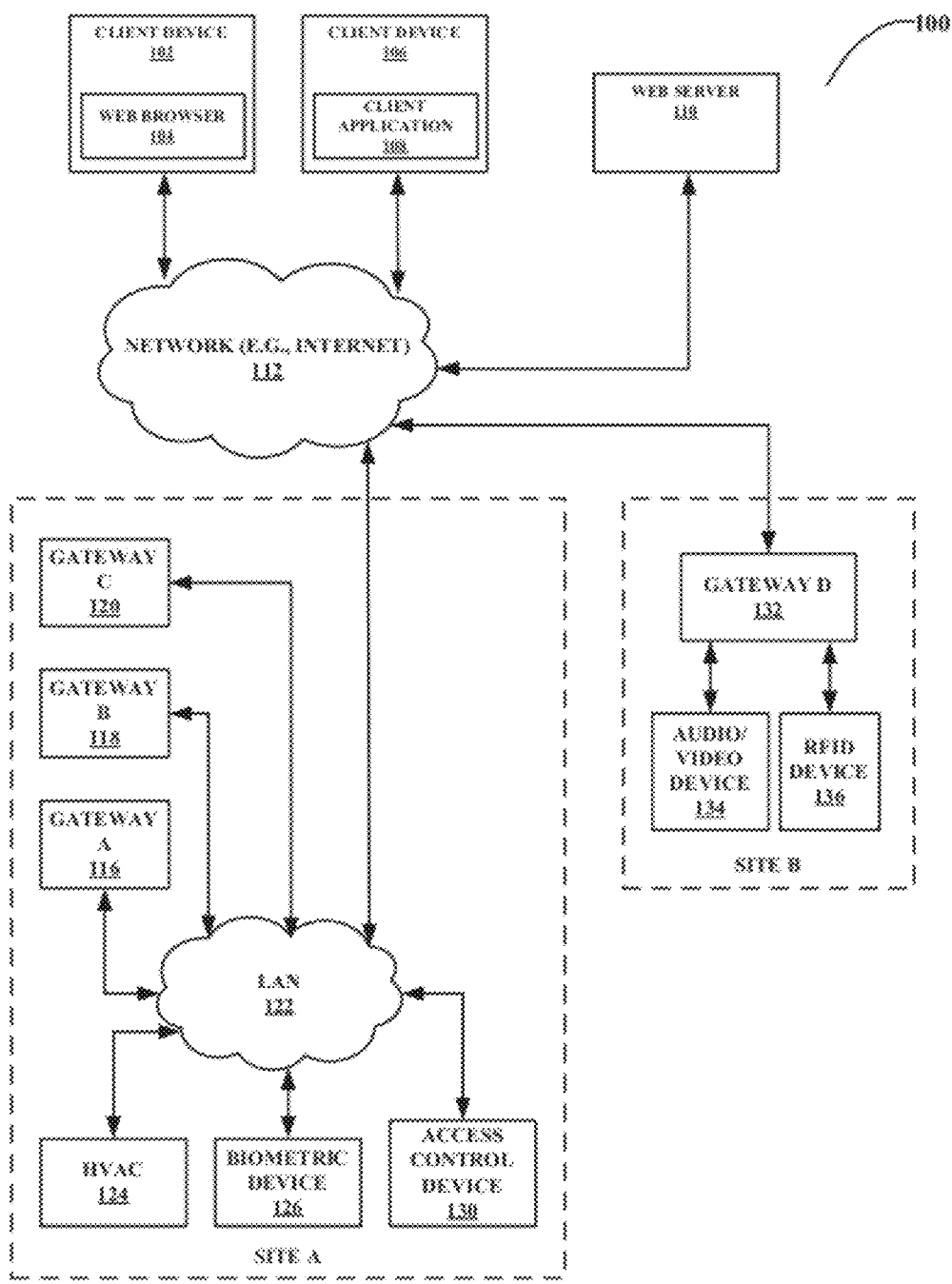
FIG. 1 is a network diagram depicting a network system, according to one embodiment, for exchanging data over a network.

FIG. 1 is a network diagram depicting a network system 100, according to one embodiment, for exchanging data over a computer network 112 (e.g. TCP/IP network). For example, the network system 100 comprises client devices 102, 106, a web server 110, and gateways 116, 118, 120 at a location site A, and a gateway 132 at a location site B. For example, location site A may be a store in a city and location site B may be an office in another city. A location site may include, for example, one or more floors of an office building, a residential house, an area of a factory or retail space, and so forth. In another example, location sites may overlap each other.

For purposes of the present embodiment, the terms "sites" and "premises" refer to any location to be monitored, whether residential, commercial, public, or secured. Further, the term "a" is generally used in the present disclosure to mean one or more. Still further, the terms "coupled" and "operatively coupled" mean connected in such a way that data may be exchanged. It is understood that "coupled" and "operatively coupled" do not require a direct connection, a wired connection, or even a permanent connection. It is sufficient for purposes of the present embodiment that the connection(s) be established for the sole purpose of exchanging information.

The client devices 102, 106 are connected to the computer network 112. The client devices 102, 106 can include, but are not limited to, a desktop computer, a laptop computer, a mobile computing device, a mobile smart phone device, and so forth. A network interface means is provided to enable the client devices 102, 106 to send and receive data to and from the computer network 112. The client device 102 may include a web browser 104 that may be in communication with the web server 110 via the computer network 112. In another example, the client device 106 includes a programmatic client, such as a client application 108 configured to communicate with the web server 110 via the computer network 112. The web browser 104 or the client application 108 may be used to display some or all of the information and monitoring data provided by gateways 116, 118, 120, and 132.

The computer network 112 can include a local area network (LAN) where Gigabit Ethernet switches are used to switch data. In another example, the computer network 112 includes a wide area network, such as the Internet. In general, computer network 112 may be a public network or private network, a single network or a combination of several networks. In most embodiments, computer network 120 may be, but is not required to be, an IP-based network. In some embodiments it may be desirable for all or a portion of network 120 to include publicly available networks, such as the Internet, to avoid the need for installing, purchasing, or leasing additional infrastructure.

The web server 110 may also connect to the computer network 112 both to receive and transmit data. The web server 110 may also be referred to as a web-based host. The web server 110 is connected to the computer network 112 by a means of a network interface. The network interface can take the form of a network interface card (not shown) installed within the web server 110 to enable data to sent and received to and from the computer network 112 by the web server 110.

In one embodiment, the web server 110 identifies one or more gateway(s) for the client devices 102, 106 to communicate with, so as to monitor and/or control the security devices connected to the corresponding gateway(s).

In another embodiment, the web server 110 may provide server-side functionality, via the computer network 112, to the client devices 102, 106. The client devices 102, 106 may enable users that utilize the network system 100 and more specifically, the web server 110, to view monitoring data (e.g. audio/video feed) from security devices connected to gateways 116, 118, 120, and 132 over the computer network 112. These transactions may include transmitting, receiving (communicating) and processing data to, from, and regarding monitoring data and users of the network system 100. The data may include, but are not limited to audio, video, picture, metadata, camera configuration data, client device configuration data, and network data monitoring data. The web server 110 can provide other functions including storing monitoring data to an internal or external disk storage device (not shown), playing back recorded monitoring data.

In one embodiment, the web server 110 may include a directory of gateways and the location of corresponding connected security devices. The web server 110 is described in more detail below with respect to FIGS. 2A, 2B, and 2C. As such, the web server 110 may correlate the gateway 116 at site A to the gateway 132 at site B. In one embodiment, the correlation may be generated pursuant to predefined settings or configuration based on user profile, organization topology, hierarchy, bandwidth and other factors. For example, a user at client device 102 may be a manager responsible for stores located on the West coast. If both sites A and B are on the West coast, the web server correlates gateway 116 to gateway 132. As such, based on the user profile and the organization topology, the user can access only gateway 116 to obtain monitoring data from sites A and B. In other words, the user does not have to communicate directly with several gateways to monitor all security devices attached to the corresponding gateways. In another embodiment, the web server 110 may correlate gateway 116 with other gateways. In yet another embodiment, the other gateways may be correlated with other gateways. For example, information from other gateways correlated with the gateway 132 which is correlated with gateway 116 may be communicated with the user at the client device 102 or 106.

Generally, gateways 116, 118, 120, and 132 include a processor-based device that operate to monitor conditions at a target site or premise, to analyze monitoring data, to detect alarm conditions at the target site or premise, to capture information relating to such alarm conditions, and to send such monitoring information to client devices 102, 106 and/or the web server 110.

Gateways 116, 118, and 120 are located at the same site A. In one embodiment, gateways 116, 118, 120 are capable of balancing their respective load. Furthermore, gateways 116, 118, 120 may provide a redundant backup of each other. Gateways 116, 118, 120 are connected to a local area network LAN 122. In another embodiment, gateways 116, 118, 120 communicate with one another via a peer-to-peer network.

Security devices (e.g. monitoring devices and controlling devices) 124, 126, and 130 are connected to the gateways 116, 118, 120 via LAN 122. Monitoring devices include, for example, sensors. The gateways are not limited to connect to any specific type or model of sensors or monitoring devices. Any sensor may be used, depending on the desired type and level of protection. Examples include, without limitation, microphones, cameras, magnetic contact switches, audio sensors, infrared sensors, motion detectors, fire alarms, and carbon monoxide sensors. For illustration purposes, location site A in FIG. 1 includes a biometric device 126 (e.g. fingerprint reader), and an access control device 130 (e.g. door/gate access sensor).

In addition, controlling devices may include devices that can be controlled such as a HVAC system 124 (e.g. heater/air conditioning system including thermometer, smoke sensor, thermostat), a gate/door lock, a camera positioning system (e.g. tilt, pan).

The HVAC system 124, the biometric devices 126, and the access control device 130 are located at site A and are connected to the gateway 116 via LAN 122.

The gateway 132 is located at another location site B away from location site A (e.g. different physical locations). An audio/video device 134 (e.g. camera, microphone) and an RFID device 136 (e.g. card reader) are directly connected to gateway 132. The gateway 132 communicates with the computer network 112.

In another embodiment, gateways 116, 118, and 120 from site A communicate with the gateway 132 from site B. As such, client devices 102, 106 can monitor data from audio/video device 134 and RFID device 136 connected to the gateway 132 by communicating only with the gateway 116. Similarly, client devices 102, 106 can monitor data from the HVAC 124, the biometric device 126, and the access control device 130 connected to gateway 116 by communicating only with the gateway 132.

Figure 2A:
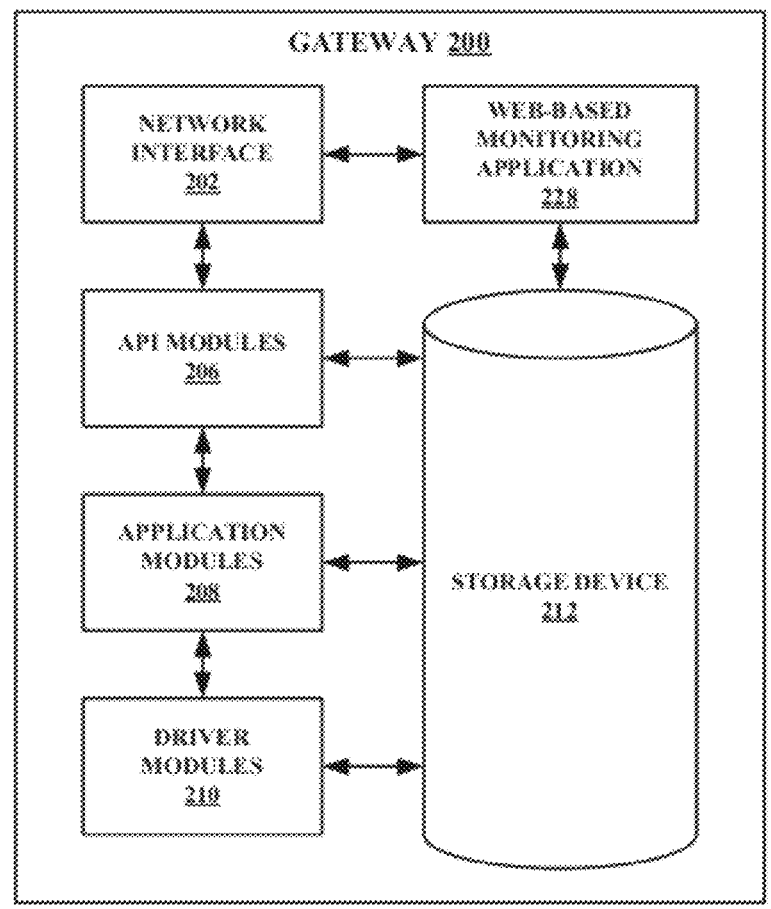
FIG. 2A is a block diagram illustrating an example embodiment of a gateway.

FIG. 2A is a block diagram illustrating an example embodiment of a gateway 200. The gateway 200 includes a network interface 202, API modules 206, application modules 208, driver modules 210, a web-based monitoring application 228, and a storage device 212. The network interface 202 enables the gateway to communicate with the computer network 112. The application programming interface (API) enable the gateway 200 to interface the gateway with the client devices 102, 106, the web server 110, and other third party devices (not shown). The application modules 208 enable the gateway 200 to monitor or control the corresponding monitoring or controlling devices connected to the gateway 200. In addition, the application modules 208 enable the gateway 200 to provide add-on expandable services discussed further below. The driver modules 210 include device drivers to enable interaction of the application modules 208 with the hardware of the corresponding monitoring or controlling devices. The web-based monitoring application 228 enables the gateway 200 to communicate monitoring and controlling data with the client device. The web-based monitoring application 228 is discussed in more detail with respect to FIG. 2C. The storage device 212 may be used to store monitoring data from the monitoring devices connected to the gateway 200, APIs from API modules 206, software application from application modules 208, device drivers from driver modules 210, and a configuration of the gateway 200. For example, the configuration of the gateway 200 may include a topology or hierarchy of at a user level, organization level, partner level. The configuration of the gateway may include specifically an enterprise configuration of gateway (based on the topology/hierarchy previously mentioned). In one embodiment, the configuration of the gateway 200 may be replicated to other gateways that are correlated by the web server based on the topology/hierarchy. For example, some gateway can have access control to a limited number of security devices. In another embodiment, each gateway may be custom configured. In another embodiment, the gateway is configured to aggregate data from multiple gateways (that may be correlated by the web server 110 based on the topology) and present the aggregated data to the client device.

FIG. 2B is a block diagram illustrating another example embodiment of the gateway 200. For example, the gateway 200 includes a camera API 212, a camera application module 214, and camera drivers 216. The camera API 212 provides an interface to the web browser 104 or the client application 108 of the client device to receive and send data from a camera connected to the gateway 200. The camera application module 214 enables the client device to receive data (e.g. audio and video) from the camera via the camera API 212. In another embodiment, the camera application module 214 enables the client device to send data to the camera (e.g. focus, tilt, pan, zoom) to the camera via the camera API 212. The camera drivers 216 include one or more drivers for different brand or manufacturer of cameras.

In another example, the gateway 200 also includes an access control API 216, an access control application module 218, and access control drivers 220. The access control API 216 provides an interface to the web browser 104 or the client application 108 of the client device to receive and send data from an access control device (e.g. a door access at a monitored site) connected to the gateway 200. The access control module 218 enables the client device to receive data (e.g. time and ID log of the door access at the monitored site) from the access control device via the access control API 216. In another embodiment, the access control module 218 enables the client device to send data to the access control device (e.g. open, close, lock door) to the access control device via the access control API 216. The access control drivers 220 include one or more drivers for different brand or manufacturer of access control devices.

One advantage of one of the embodiments of the gateway 200 is the ability to easily connect additional devices or third party devices. This is illustrated with respect to other API 222, other module 224, and other drivers 226. As such, the gateway 200 is not limited to any particular manufacturer of devices or brand of devices. The gateway 200 allows for easy expansion and plug-in features using additional APIs, corresponding modules, and corresponding device drivers.

Figure 2C:
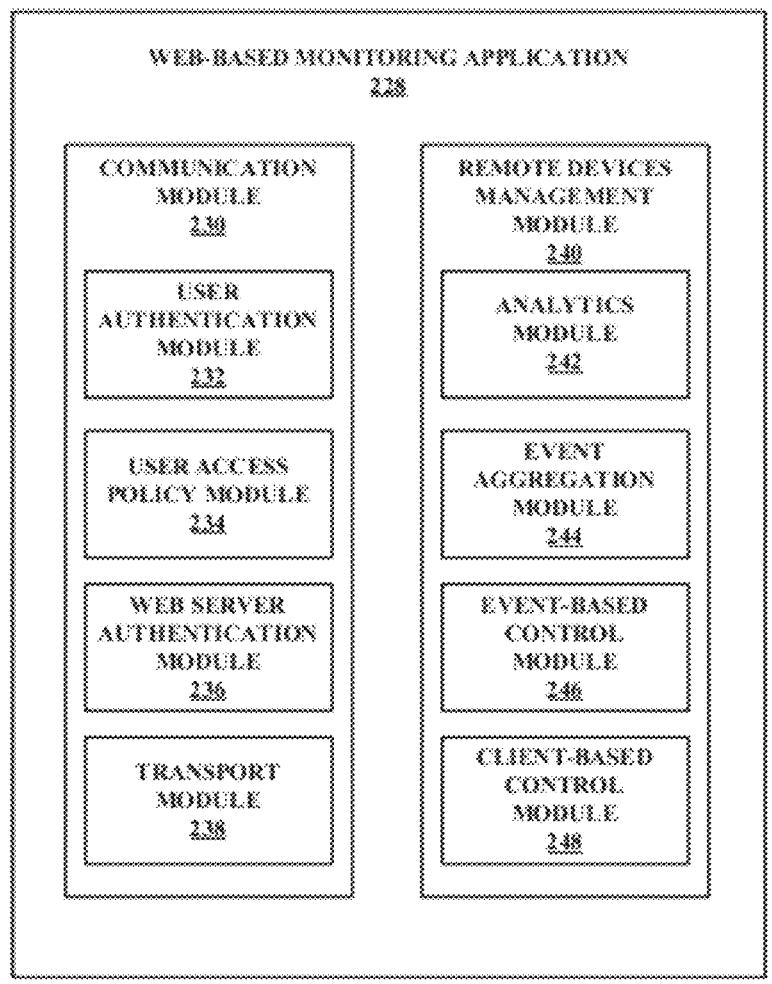
FIG. 2C is a block diagram illustrating an example embodiment of a web-based monitoring application of a gateway.

FIG. 2C is a block diagram illustrating an example embodiment of a web-based monitoring application 228 of the gateway 200. The web-based monitoring application 228 enables client devices to remotely monitor and control monitoring and controlling devices connected to the gateway 200 via the web browser 104 or the client application 108 at the client devices 102, 106.

In one embodiment, the web-based monitoring application 228 includes a communication module 230 and a remote devices management module 240. The communication module 230 enables communication between the gateway 200 and the client devices 102, 106. The remote devices management module 240 enables the client devices 102, 106 to monitor or control the monitoring or controlling devices connected to the gateway 200.

For example, the communication module 230 includes a user authentication module 232, a user access policy module 234, a web server authentication module 236, and a transport module 238.

The user authentication module 232 authenticates a user at the client device based on a user profile of the user. An example of user authentication may include verifying the username and password provided by the client device with a predefined user profile. The predefined user profile may be stored in the storage device 212 or at the web server 110.

The user access policy module 234 limits or grants the user at the client device access to the monitoring and/or controlling devices connected to the gateway. For example, a user with limited privilege may have access to the monitoring data to a particular site (e.g. first floor only) or a specific monitoring device (e.g. HVAC only). On the other hand, a user with executive privilege may not only be able to view monitoring data and control security devices from more sites.

The web server authentication module 236 authenticates a communication between the gateway 200 and the web server 110. For example, the gateway transmits a unique token to the web server 110 for authentication prior to establishing the secured communication. Those of ordinary skills in the art will recognize that other means of authentication between the gateway and the web server 110 may be used.

The transport module 238 enables peer-to-peer communication between gateways. As such, a client device communicating with one gateway at a first location is also able to communicate with another gateway at a second location.

For example, the remote device management module 240 of the web-based monitoring application 228 includes an analytics module 242, an event aggregation module 244, an event-based control module 246, and a client-based control module 248.

The analytics module 242 analyzes audio/video, and other detected changes from the monitoring devices and generates events based on the analysis. For example, the analytics module 242 is capable of determining how many people have entered or left an activity zone (e.g. a room, a hallway) in a video feed, the direction of the movement of individuals in a video feed, the temperature of individuals in a video feed, facial recognition of individual in a video feed, and so forth. Events are generated based on the analysis and predefined user-configured settings. A user at the client device is able to configure the conditions for generating an event from the web browser 104 of the client device 102 or the client application 108 of the client device 106.

The event aggregation module 244 aggregates events generated from the analytics module 242. For example, events generated based on the analysis and predefined/user-configured settings are aggregated in a log stored in a storage device attached to the gateway, in a storage device attached to another gateway, in a storage device attached to the web server 110, or in a storage device connected to the client device.

The event-based control module 246 communicates a command to at least one controlling device connected to the corresponding gateway based on an event identified in event aggregation module 244 based on an event configuration. For example, an event comprises a temperature of a room reaching a predefined maximum temperature. The event-based control module 246 may communicate to the HVAC system to turn on the air conditioning system for the room if such event occurs.

The client-based control module 248 communicates a command to one or more controlling devices of the corresponding gateway based on a command initiated and communicated from the client device. For example, a user at the client device may initiate a command to pan a camera connected to the gateway. Such command would be communicated to the camera via the client-based control module 248.

Figure 3:
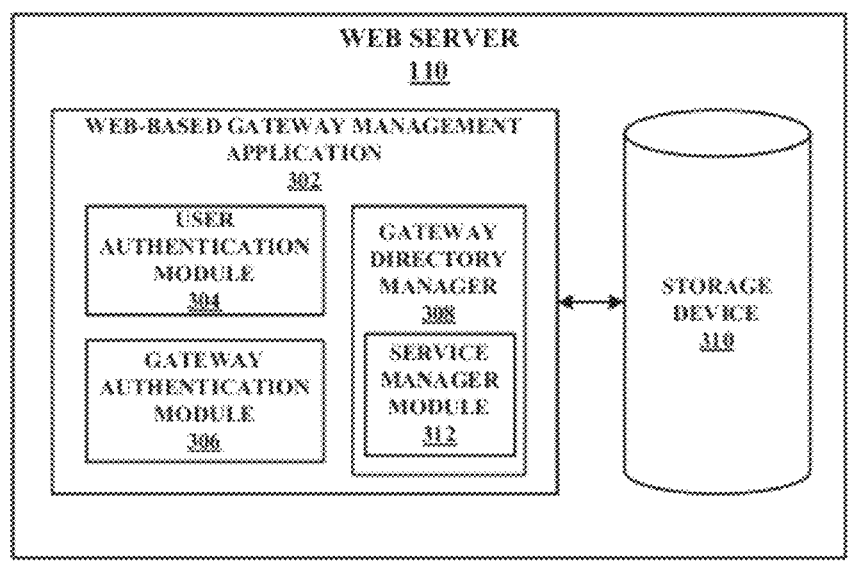
FIG. 3 is a block diagram illustrating an example embodiment of a web server.

FIG. 3 is a block diagram illustrating an example embodiment of a web server 110 also referred to as a web-based host. The web server 110 comprises a web-based gateway management application 302 and a storage device 310. The web-based gateway management application 302 identifies a gateway associated with a user at the client device, authenticates with the user at the client device, and authenticates with the identified gateway.

In one embodiment, the web-based gateway management application 302 includes a gateway directory manager 308, a user authentication module 304, and a gateway authentication module 306. The gateway directory manager 308 identifies a gateway associated with a user profile. For example, a user may only be able to access a particular gateway or a particular set of devices connected to a gateway. As such, a west coast manager of an organization may be able to access monitored sites only from west coast stores of the organization. In contrast, a user with higher privileges may be able to access more gateways and devices. As such, the CEO of an organization with stores throughout the U.S. may be able to view monitoring data from all the stores in the U.S.

In another embodiment, the gateway directory manager 308 includes a service manager module 312 to enable add-on services to the user at the client device. For example, the add-on services include, but are not limited to, remote storage, remote audio, two-way audio, dynamic backup, or reporting based on the user profile.

The user authentication module 304 authenticates the web server 110 with the user at the client device based on the user profile. For example, the web server 110 verifies the username and password of the user at the client device.

The gateway authentication module 306 authenticates the identified gateway. For example, the web server 110 receives a unique token from the identified gateway to authenticate the identified gateway prior to establishing secured communication between the web server and the gateway.

The storage device 310 may be used to store user profiles, tokens from gateways, a directory of gateways with corresponding devices, services from the gateways, a directory of gateways associated with a user profile, and a directory of connected security devices associated with a user profile.

Figure 4:
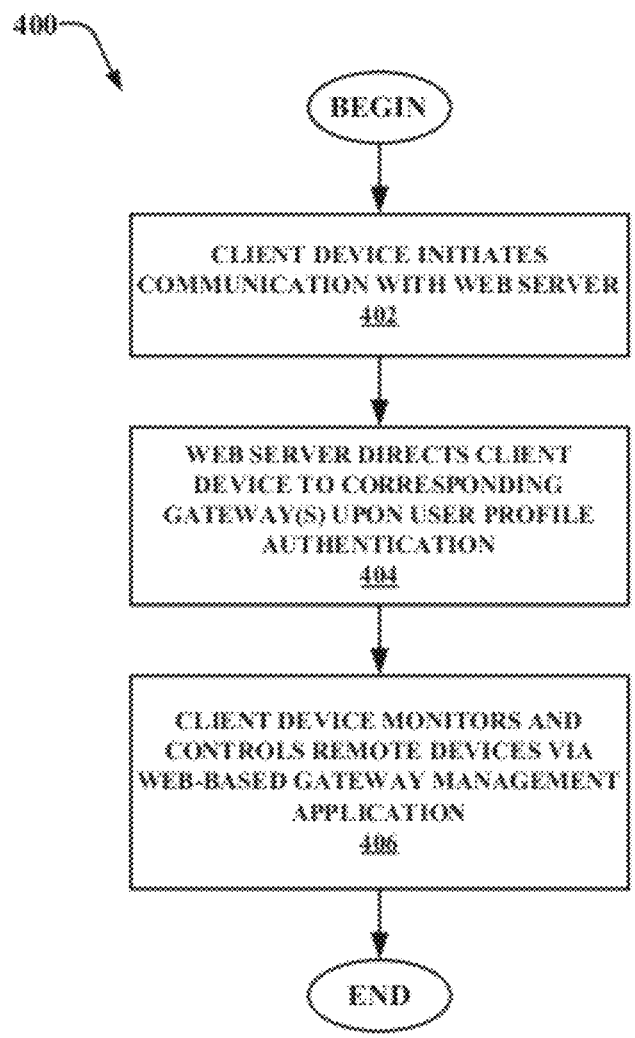
FIG. 4 is a flow chart of one embodiment of an example method for monitoring and controlling devices attached to a gateway.

FIG. 4 is a flow chart of one embodiment of an example method for monitoring and controlling devices attached to a gateway. At 402, a user at a client device initiates communication with a web server to access monitoring data from the devices connected to a gateway. At 404, the web server directs the client device to the corresponding gateway based on the user profile of the user at the client device. At 406, the client device is able to monitor and control from a central interface monitoring and controlling devices connected to the identified gateway(s). In one embodiment, the client device receives an aggregated view of all security devices from several correlated gateways by communicating with only one gateway.

Figure 5:
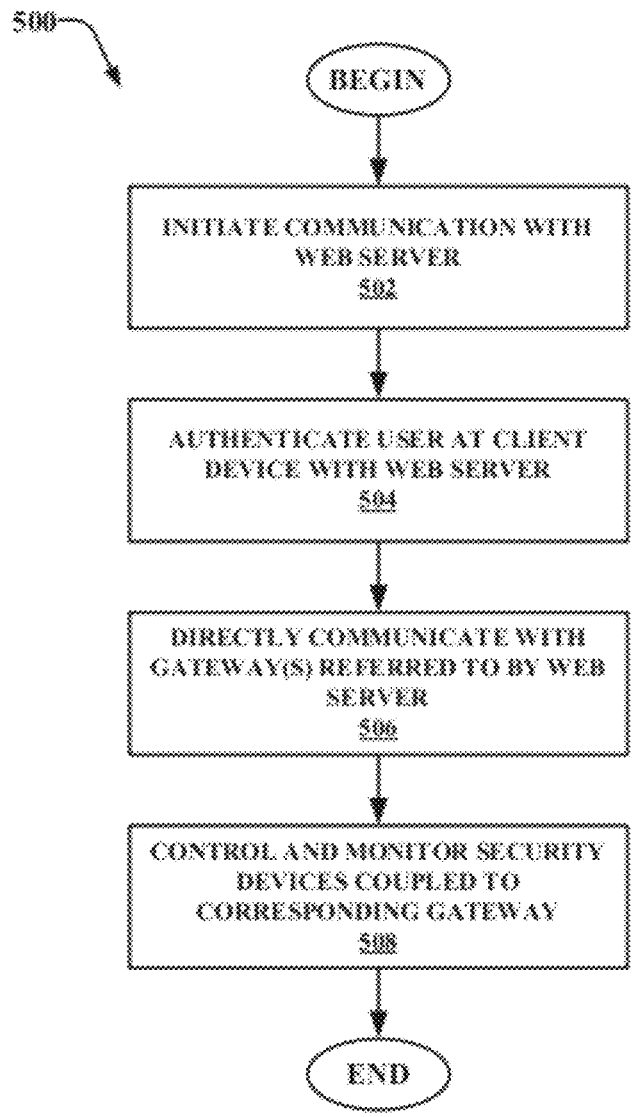
FIG. 5 is a flow chart of one embodiment of an example method for communicating with a gateway and a web server from a client device.

FIG. 5 is a flow chart of one embodiment of an example method for communicating with a gateway and a web server from a client device. At 502, a client device initiates a communication with a web server. At 504, the client device authenticates the user with the web server. At 506, the client device directly communicates with the gateway(s) referred and identified by the web server. At 508, the client device is able to control and monitor devices connected to the corresponding gateway. In another embodiment, the client device can control and monitor devices connected to other correlated gateways.

Figure 6:
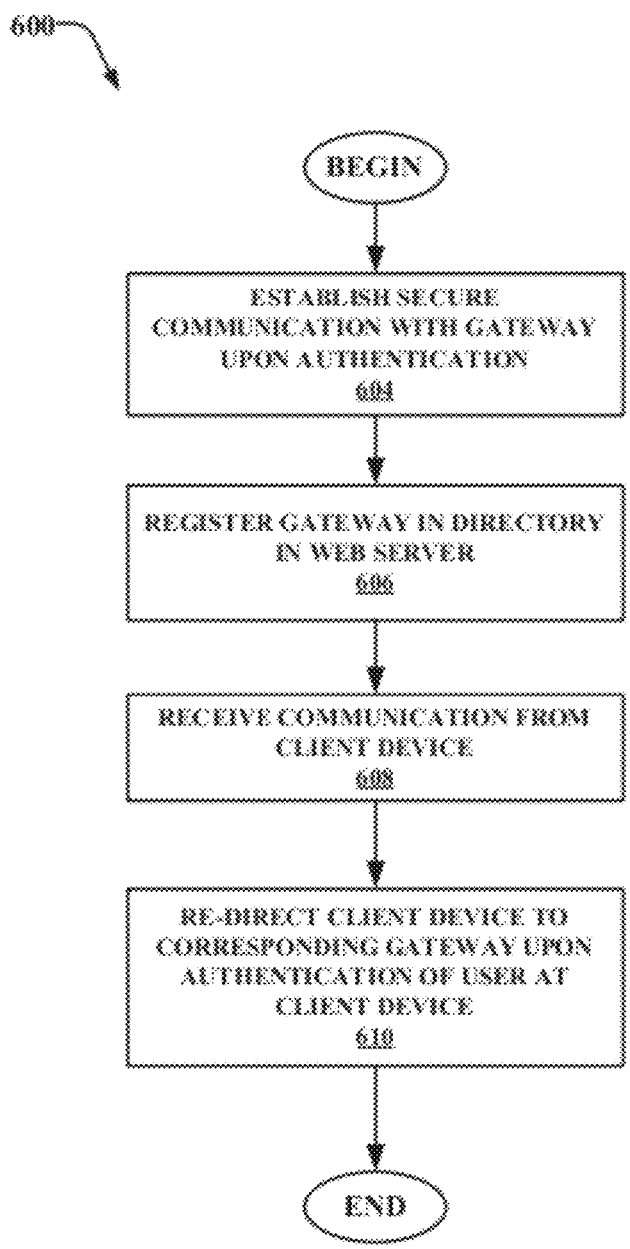
FIG. 6 is a flow chart of one embodiment of an example method for communicating with a gateway and a client device from a web server.

FIG. 6 is a flow chart of one embodiment of an example method for communicating with a gateway and a client device from a web server. At 604, the web server establishes a secure communication with a gateway upon authentication of the gateway. At 606, the web server registers the gateway in a directory in the web server. At 608, the web server receives a communication from the client device to access monitoring data. At 610, the web server re-directs the client device to the corresponding gateway upon authentication of the user at the client device. As such, the client device communicates directly with the identified gateway thereby saving bandwidth resources from the web server.

Figure 7:
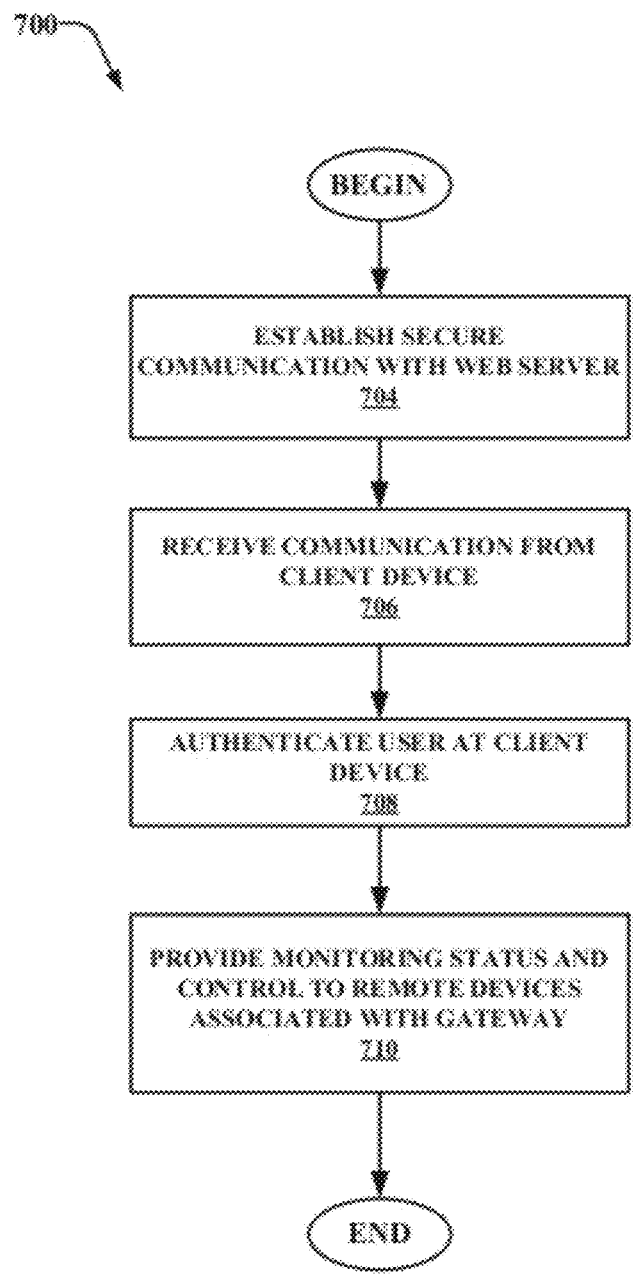
FIG. 7 is a flow chart of one embodiment of an example method for communicating with a web server and a client device from a gateway.

FIG. 7 is a flow chart of one embodiment of an example method for communicating with a web server and a client device from a gateway. At 704, the gateway establishes a secure communication with the web server. At 706, the gateway identified by a web server receives a communication from a client device. At 708, the gateway authenticates the user at the client device. At 710, the gateway provides monitoring status and control to devices connected to the gateway. In another embodiment, the gateway is correlated to other gateways by the web server. In other words, the web server may introduce the gateway to establish a direct secure communication with other gateways.

In another embodiment, the gateway is interfaced with the client device with an application programming interface (API). The corresponding monitoring or controlling device coupled to the gateway is monitored and controlled with an application module. Interaction of the application module with the corresponding monitoring or controlling device is enabled with a device driver.

In another embodiment, communication with the web server and the client device is enabled with a communication module of the gateway. The client device is enabled to monitor or control the plurality of monitoring or controlling devices coupled to the gateway with a remote devices management module of the gateway.

In one embodiment, enabling communication with the web server and the client device comprises authenticating a user at the client device based on a user profile of the user with a user authentication module. The user at the client device is limited or granted access to the monitoring and controlling devices with a user access policy module. A communication between the gateway and the web server is authenticated with a web server authentication module. The peer-to-peer communication between gateways is enabled with a transport module.

In one embodiment, enabling the client device to monitor or control the monitoring or controlling devices connected to the gateway comprises analyzing audio and video from the monitoring devices and to generate events based on the analysis with an analytics module. The events generated from the analytics module are aggregated with an event aggregation module. A command is communicated to at least one controlling device of the corresponding gateway based on an event identified in the aggregated events based on an event configuration with an event-based control module. A command is communicated to at least one controlling device of the corresponding gateway based on a command communicated from the client device with a client-based control module.

Figure 8:
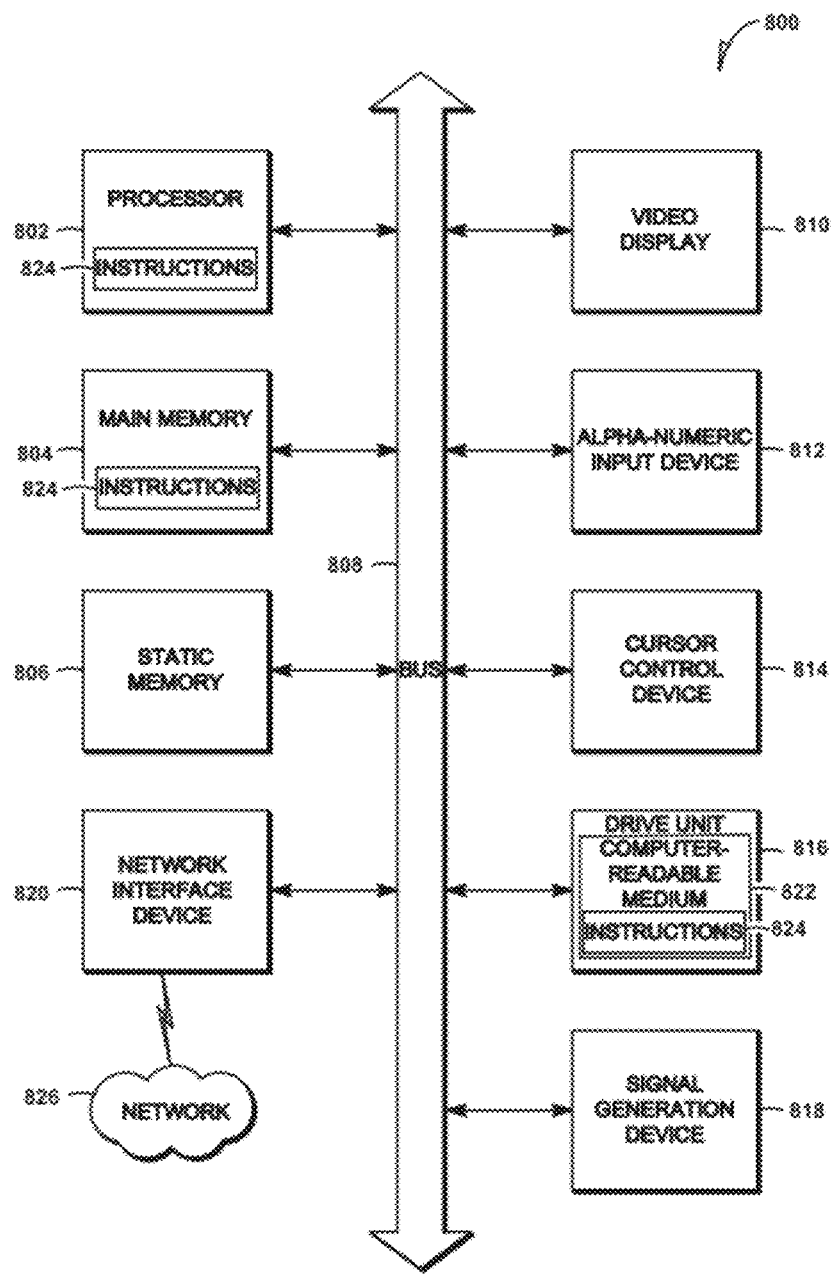
FIG. 8 shows a diagrammatic representation of machine in the example form of a computer system within which a set of instructions may be executed to cause the machine to perform any one or more of the methodologies discussed herein.

FIG. 8 shows a diagrammatic representation of machine in the example form of a computer system 800 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820 utilizing any one of a number of well-known transfer protocols (e.g., HTTP).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

Figure 9A:
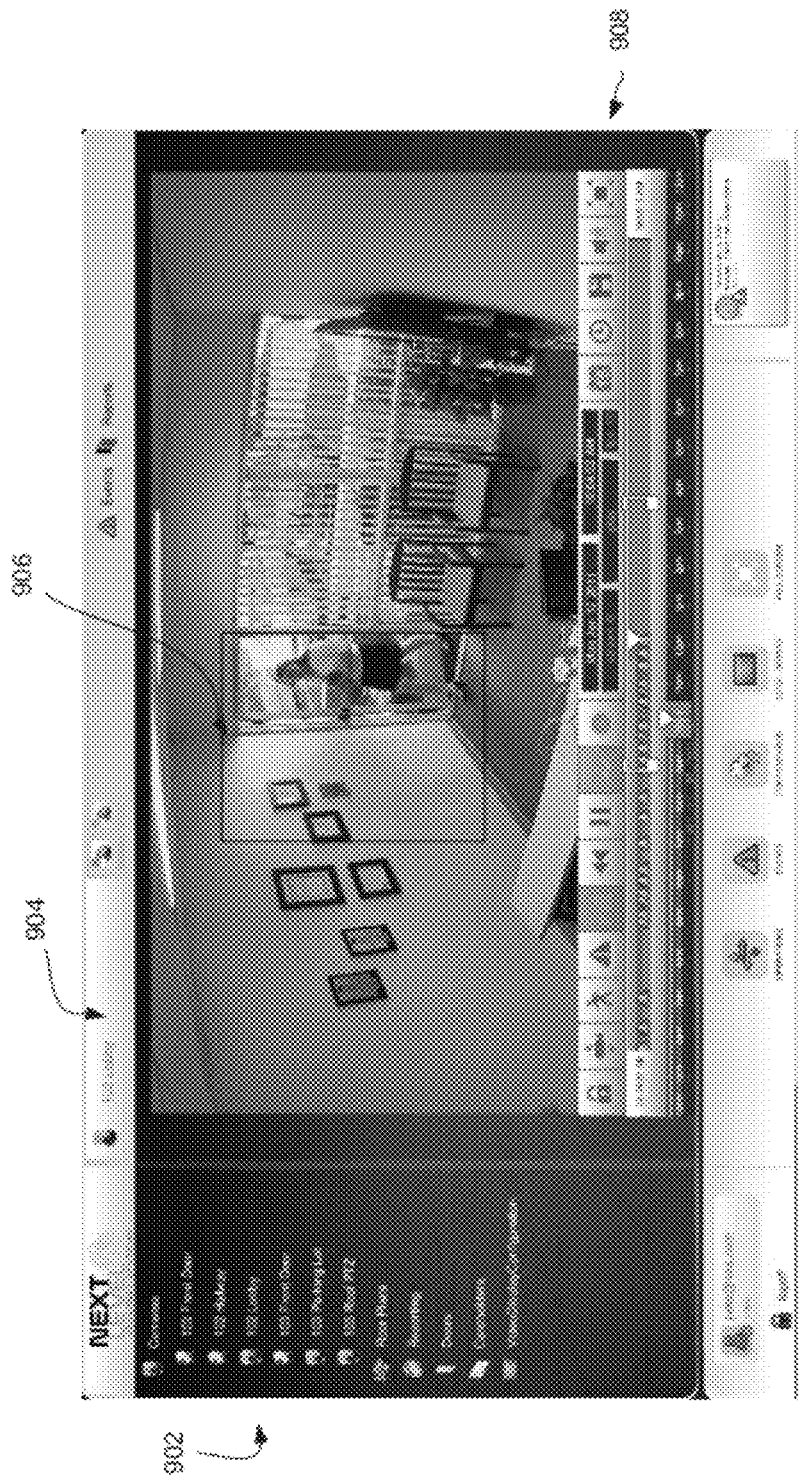
FIG. 9A is an example diagram of a user interface for video management at the client device.
Figure 9B:
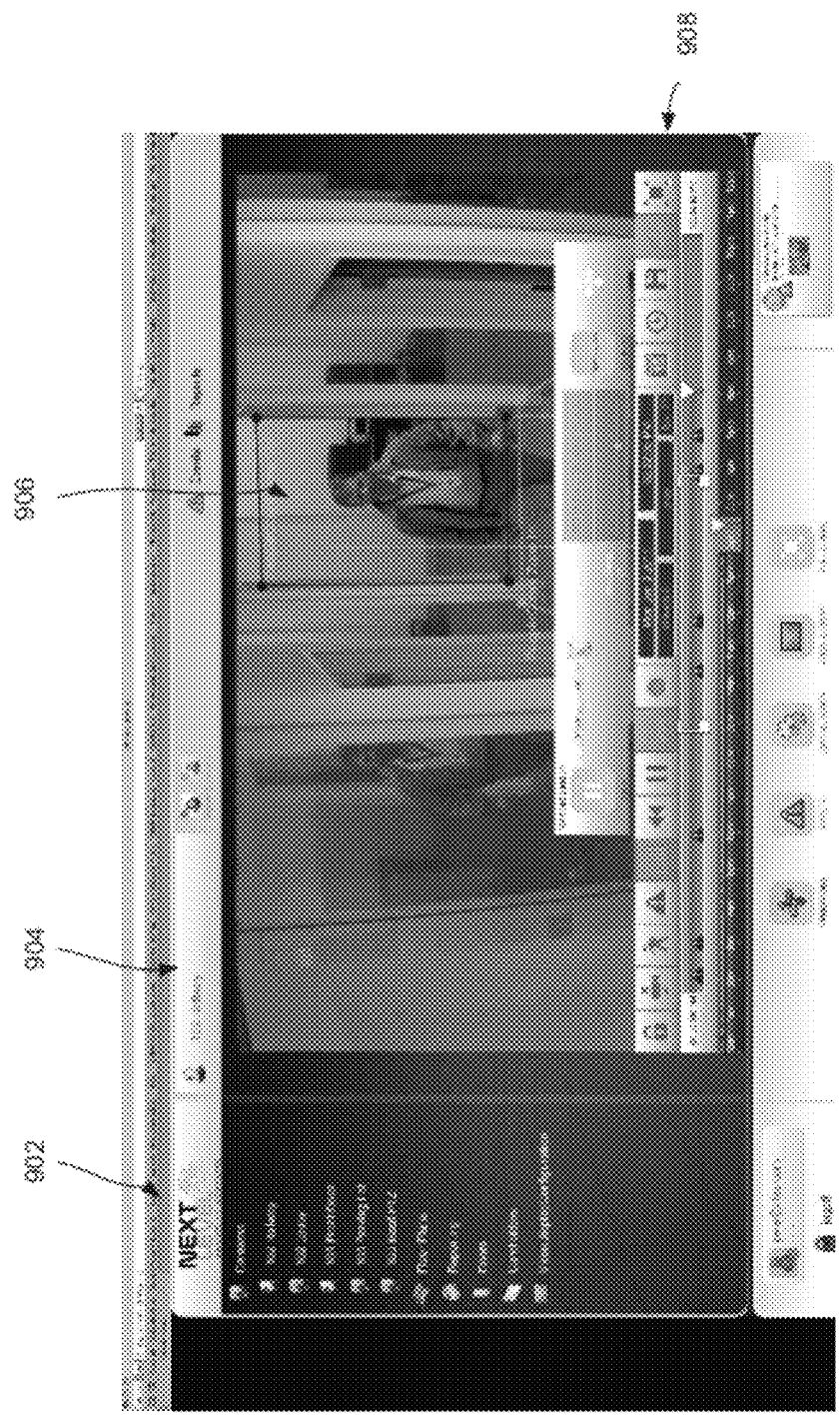
FIG. 9B is another example diagram of a user interface for video management at the client device.

FIGS. 9A and 9B are example diagrams of a centralized user interface for management of security devices from a remote client device. A list of security devices (cameras, floor plans, doors, and so forth) connected to one or more gateways are listed in windows pane 902. The current window pane 902 is currently being displayed in the screenshot. The area of activity or event (from video analytics) is illustrated as a box 906 displayed on the video feed. The toolbar 908 illustrate an example of a video management. Video management features may include rewind, fast forward, record, display of events or event triggers on a timeline, data and time stamps.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A gateway comprising:
a processor;
an application programming interface (API) configured to interface the gateway with a client device;
an application module configured to monitor or control a security device coupled to the gateway;
a device driver configured to enable interaction of the application module with the corresponding security device;
a communication module configured to enable communication with a web server, the client device, and other gateways, to receive additional APIs, respective application modules, and respective device drivers, and to copy a configuration of the gateway to other gateways;
a remote device management module, implemented using the processor, configured to aggregate monitoring data from the security device coupled to the gateway and from other security devices respectively coupled to other gateways that are correlated with the gateway by the web server, and to enable the client device to receive the aggregated monitoring data and to control the security device coupled to the gateway and the other security devices coupled to the other gateways,
the communication module comprising:
a user authentication module configured to authenticate a user at the client device based on a user profile of the user;
a user access policy module configured to limit or grant the user at the client device access to the security device;
a web server authentication module configured to authenticate a communication between the gateway and the web server; and
a transport module configured to enable peer-to-peer communication between gateways, the client device, and the web server, the remote device management module comprising:
an analytics module configured to analyze audio, video, and data from the security device and to generate events based on the analysis;
an event aggregation module configured to aggregate events generated from the analytics module;
an event-based control module configured to communicate a command to the security device of the corresponding gateway based on an event identified in the aggregated events based on an event configuration; and
a client-based control module configured to communicate a command to the security device of the corresponding gateway based on a command communicated from the client device.

2. The gateway of claim 1 wherein the security device comprises a camera control device, an audio control device, a switch, a HVAC system, a video device, an audio device, a biometric sensor, an access control device, a temperature sensor, an RFID device, or a motion-controlled sensor.

3. The gateway of claim 1 wherein the web server comprises a web-based gateway management application configured to identify a gateway associated with a user at the client device, to authenticate with the user at the client device, to authenticate with the identified gateway, and to correlate the identified gateway with the other gateways.

4. The gateway of claim 1 wherein the client device is configured to communicate with a first gateway identified by the web server, to receive monitoring data from a second security device coupled to a second gateway, to control the second security device coupled to the second gateway by communicating with the first gateway coupled to a first security device, the first gateway correlated with the second gateway by the web server.

5. The gateway of claim 3 wherein the web-based gateway management application comprises:
a gateway directory manager configured to identify a gateway associated with a user profile;
a user authentication module configured to authenticate with the user at the client device based on the user profile; and
a gateway authentication module configured to authenticate the identified gateway,
wherein the gateway directory manager comprises a service manager module configured to enable an add-on service to the user at the client device.

6. The gateway of claim 5 wherein the add-on service comprises remote storage, remote audio, two-way audio, dynamic backup, reporting based on the user profile, organization topology mapping, or gateway access configuration.

7. A computer-implemented method comprising:
identifying a web server from a gateway coupled to a security device, the web server comprising a management application configured to communicate with the gateway, the management application having a service manager module to enable additional services from the gateway and the security device;
aggregating monitoring data from the security device coupled to the gateway and from other security devices respectively coupled to other gateways that are correlated with the gateway by the web server;
communicating with a client device introduced by the web server by sending the aggregated monitoring data to the client device, and receiving a request from the client device to control the security device coupled to the gateway and the other security devices coupled to the other gateways from a web-based user interface at the client device;
interfacing the gateway with the client device with an application programming interface (API);
monitoring and controlling the security device coupled to the gateway with an application module;
enabling of the application module with the corresponding security device with a device driver;
receiving at the gateway additional APIs, respective application modules, and respective device drivers;
correlating the gateway with the other gateways by the web server;
copying a configuration of the gateway to the other gateways;
authenticating a user at the client device based on a user profile of the user with a user authentication module of the communication module of the gateway;
limiting or granting the user at the client device access to the security device with a user access policy module of the communication module of the gateway;
authenticating a communication between the gateway and the web server with a web server authentication module of the communication module of the gateway;
enabling peer-to-peer communication between gateways, the client device, and the web server with a transport module of the communication module of the gateway;
analyzing audio, video, and data from the security device and generating events based on the analysis with an analytics module of the remote device management module of the gateway;
aggregating events generated from the analytics module with an event aggregation module of the remote device management module of the gateway;
communicating a command to the security device of the corresponding gateway based on an event identified in the aggregated events based on an event configuration with an event-based control module of the remote device management module of the gateway; and
communicating a command to the security device of the corresponding gateway based on a command communicated from the client device with a client-based control module of the remote device management module of the gateway.

8. The computer-implemented method of claim 7 wherein the gateway comprises a communication module and a remote devices management module, the communication module configured to enable communication with the web server, the client device, and the other gateways, the remote devices management module configured to enable the client device to monitor or control the security device coupled to the gateway.

9. The computer-implemented method of claim 7 wherein the security device comprises a camera control device, an audio control device, a switch, a HVAC system, a video device, an audio device, a biometric sensor, an access control device, a temperature sensor, an RFID device, or a motion-controlled sensor.

10. The computer-implemented method of claim 7 wherein the web server comprises a web-based gateway management application configured to identify a gateway associated with a user at the client device, to authenticate with the user at the client device, to authenticate with the identified gateway, and to correlate the identified gateway with the other gateways.

11. The computer-implemented method of claim 7 wherein the client device is configured to communicate with a first gateway identified by the web server, to receive monitoring data from a second security device coupled to a second gateway, to control the second security device coupled to the second gateway by communicating with the first gateway coupled to a first security device, the first gateway correlated with the second gateway by the web server.

12. The computer-implemented method of claim 10 further comprising:
   identifying a gateway associated with a user profile with a gateway directory manager of the web-based gateway management application of the web server;
   authenticating with the user at the client device based on the user profile a user authentication module of the web-based gateway management application of the web server;
   authenticate the identified gateway with a gateway authentication module of the web-based gateway management application of the web server; and
   enabling an add-on service to the user at the client device with a service manager module of the gateway directory manager.

13. The computer-implemented method of claim 12 wherein the add-on service comprises remote storage, remote audio, two-way audio, dynamic backup, reporting based on the user profile, organization topology mapping, or gateway access configuration.

14. A non-transitory computer-readable storage medium storing a set of instructions that, when executed by a processor, cause the processor to perform operations, comprising:
   identifying a web server from a gateway coupled to a security device,
the web server comprising a management application configured to communicate with the gateway, the management application having a service manager module to enable additional services from the gateway and the security device;
   aggregating monitoring data from the security device coupled to the gateway and from other security devices respectively coupled to other gateways that are correlated with the gateway by the web server;
   communicating with a client device introduced by the web server by sending the aggregated monitoring data to the client device, and receiving a request from the client device to control the security device coupled to the gateway and the other security devices coupled to the other gateways from a web-based user interface at the client device;
   interfacing the gateway with the client device with an application programming interface (API);
   monitoring and controlling the security device coupled to the gateway with an application module;
   enabling of the application module with the corresponding security device with a device driver;
   receiving at the gateway additional APIs, respective application modules, and respective device drivers;
   correlating the gateway with the other gateways by the web server;
   copying a configuration of the gateway to the other gateways;
   authenticating a user at the client device based on a user profile of the user with a user authentication module of the communication module of the gateway;
   limiting or granting the user at the client device access to the security device with a user access policy module of the communication module of the gateway;
   authenticating a communication between the gateway and the web server with a web server authentication module of the communication module of the gateway;
   enabling peer-to-peer communication between gateways, the client device, and the web server with a transport module of the communication module of gateway;
   analyzing audio, video, and data from the security device and generating events based on the analysis with an analytics module of the remote device management module of the gateway;
   aggregating events generated from the analytics module with an event aggregation module of the remote device management module of the gateway;
   communicating a command to the security device of the corresponding gateway based on an event identified in the aggregated events based on an event configuration with an event-based control module of the remote device management module of the gateway; and
   communicating a command to the security device of the corresponding gateway based on a command communicated from the client device with a client-based control module of the remote device management module of the gateway.

* * * * *